Feb. 13, 1945   H. A. UNKE   2,369,381
WELDING RING
Filed Nov. 9, 1942

INVENTOR.
HERMAN A. UNKE
BY
Kwis Hudson & Kent
ATTORNEYS

Patented Feb. 13, 1945

2,369,381

UNITED STATES PATENT OFFICE 2,369,381

WELDING RING

Herman A. Unke, Parma Heights, Ohio

Application November 9, 1942, Serial No. 464,942

2 Claims. (Cl. 285—192)

This invention relates to welding rings of the type used in forming welded joints between tubular metal members and aims to provide an improved article of this kind which can be used in making a more satisfactory joint by welding, brazing, soldering or the like.

Another object of the invention is to provide an improved form of welding ring having circumferential grooves adapted to receive the ends of the tubular parts to be connected and in which the walls of the grooves are shaped to produce a tight engagement between the ring and the inner surfaces of sad parts so as to eliminate cracks and crevices in which bacteria or other contaminating matter can collect.

Other objects and advantages of the invention will be apparent from the following description when taken in conjunction with the accompanying sheet of drawings in which.

Figure 5:
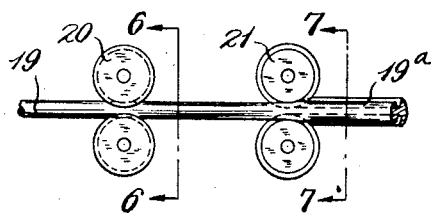
Fig. 5 is a view illustrating the step of grooving stock used in forming my ring.
Figures 6, 7:
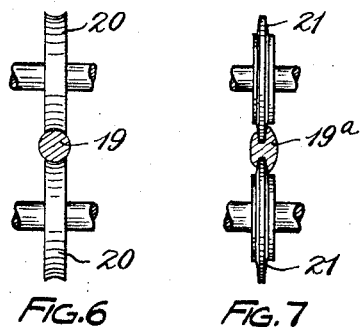
Figure 8:
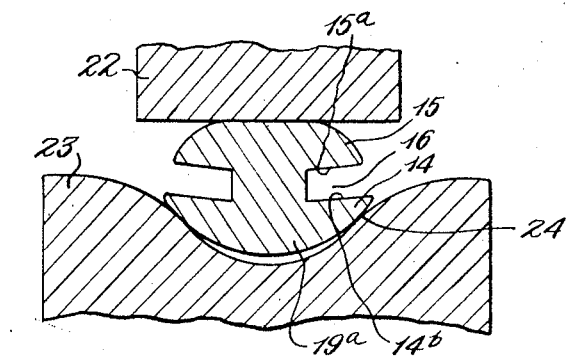

Figs. 6 and 7 are transverse sectional views taken, respectively, on lines 6—6 and 7—7 of Fig. 5; and Fig. 8 is a sectional view illustrating a further forming operation carried out on the grooved stock.

Figure 3:
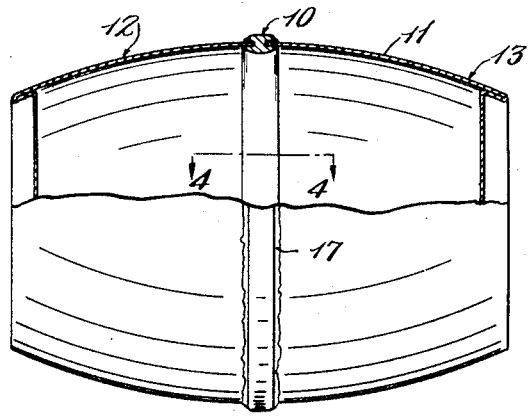
Fig. 3 is an elevation, with portions broken away, showing a barrel comprising sections connected by my improved ring.

In the drawing I show a welding ring or connector 10 for use in joining tubular metal parts by welding, such as the sections 11 and 12 of the metal barrel or container 13 shown in Fig. 3. The welding ring 10 comprises an annular metal member having substantially oppositely extending pairs of circumferential axial flanges 14 and 15. The flanges of each pair are separated by a circumferential groove 16. In using the ring 10 to form a welded joint, such as that illustrated in Figs. 3 and 4, the ends of the sections 11 and 12 are inserted into the grooves 16 and are joined to the ring by the welds 17.

Figure 4:
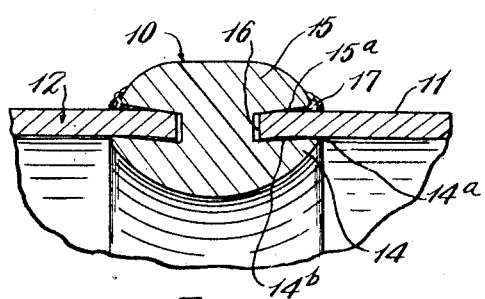
Fig. 4 is a partial sectional view through the joint formed with my ring, the section being taken on line 4—4 of Fig. 3.
Figure 2:
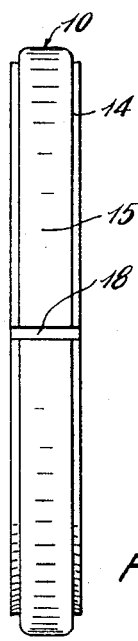
Fig. 2 is a side view thereof.
Figure 1:
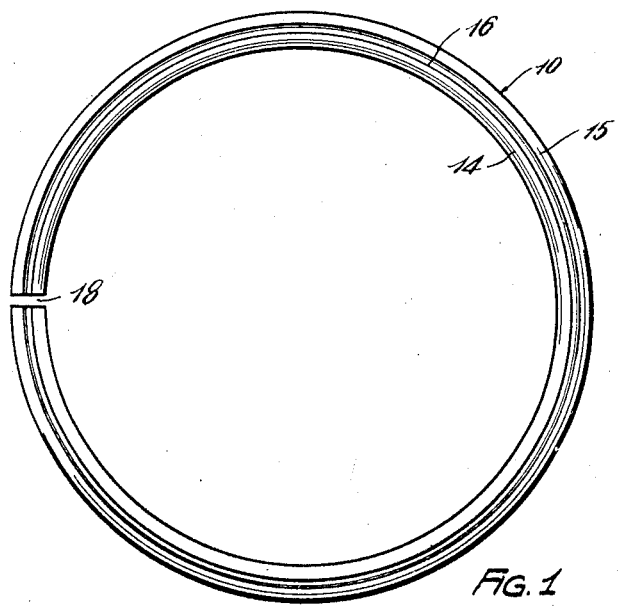
Fig. 1 is an end view of my improved ring.

In constructing the ring 10, the inner flanges 14 are preferably, though not necessarily, made somewhat longer than the outer flanges 15 and have a relatively sharp annular edge 14a at the end or top thereof and which sharp edge underlies and is substantially flush with the entrance to the groove 16. As shown in Fig. 4, the internal faces 14b which form one side wall of the grooves 16 are inclined so as to have the effect of being undercut. This is an important feature of my improved ring because it causes the sharp ends 14a of the flanges 14 to tightly engage or hug the inner surfaces of the tubular metal sections 11 and 12 when the ends of these sections are inserted into the grooves 16. Such engagement of the ends 14a with the inner surfaces of the sections 11 and 12 is desirable because it results in a tighter joint and eliminates cracks or crevices in which bacteria or other contaminating matter can collect.

As shown in the drawing and particularly in Figs. 3 and 4, the ring 10 is so formed that the internal faces 14b and 15a of the flanges 14 and 15 are inclined or beveled toward the central longitudinal axis of the structure (in this instance the longitudinal axis of the barrel 13) when the bottoms of the grooves 16 are approached. In other words, as the bottoms of the grooves 16 are approached, the annular internal faces 14b and 15a are inclined toward the axis which passes through the center of the ring 10 and which is substantially coincident with the longitudinal axes of the hollow members 11 and 12. This inclination or bevel on the internal faces of the outer flanges 15 exerts a wedging action on the sections 11 and 12 while they are being inserted into the grooves 16, causing such sections to be pushed or shifted into tight engagement with the sharp ends 14a of the flanges 14. The lateral pressure thus applied to the ends of the sections 11 and 12 by the bevel of the internal faces 15a may bend or deflect the ends of the sections 11 and 12 somewhat, as shown in Fig. 4. The spacing of the internal faces 14b and 15a in relation to the thickness of the members 11 and 12, and the inclination or bevel of the internal faces 15a provides spaces between the flanges 15 and the sections 11 and 12 into which the metal can be puddled during the forming of the welds 17.

My improved ring may be formed from rod stock or wire in which case the ring may be split at one point of its circumference, as indicated at 18. In Figs. 5 to 8, inclusive, I have illustrated novel method operations by which my improved ring can be formed from round wire or stock 19. The round stock is fed or advanced by a pair of cooperating feed rolls 20 and then passes between a pair of forming rolls 21. The forming rolls indent the stock at substantially diametrically opposite points while it is being advanced and thus form therein longitudinal grooves 16 having divergent side walls 15a and 14b. By having the forming rolls 21 indent the stock in a plane slightly offset from its mid-plane, as shown in Fig. 7, one set of the flanges produced on the stock, such as the inner flanges 14 in this instance, can be made longer than the other set of flanges.

The grooved stock 19a is then subjected to a further forming operation, as illustrated in Fig. 8, by the cooperating pressure members 22 and 23. The member 22 applies pressure to the top of the grooved stock, and the member 23 applies pressure at spaced points 24 lying at or near the ends of the flanges 14. The pressure thus applied to the grooved stock shapes or distorts the same to impart to the internal faces 14b of the flanges 14 the desired inclination or undercut effect. The cooperating pressure members 22 and 23 may be relatively reciprocable members or may be rolls; and, if desired, the curving of a predetermined length of the grooved stock to ring form may be carried out simultaneously with the further forming operation performed by the members 22 and 23.

It will be seen from the drawing and the foregoing description that I have provided an improved form of welding ring or connector with which a strong, tight, and satisfactory joint can be formed between a pair of tubular metal members and that the parts may be welded, brazed or soldered. When the tubular metal members are sections of a barrel or other liquid container, the joint formed therebetween by the use of my ring eliminates cracks or crevices around the inside of the container in which bacteria or other contaminating matter can collect.

While I have illustrated and described my improved ring in a somewhat detailed manner, it will be understood, of course, that I do not wish to be limited to the particular details and steps herein disclosed, but regard my invention as including such changes and modifications as come within the scope of the appended claims.

Having thus described my invention, I claim:

1. A connector of the class described for use in forming a joint between tubular metal members, comprising a metal ring having circumferential grooves extending axially thereinto from opposite ends and adapted to receive the ends of said tubular members, the internal faces of the inner and outer side walls of the grooves being inclined toward the axis, which passes through the center of the ring and which is substantially coincident with the axes of the tubular members to be connected, as the bottoms of the grooves are approached and the ends of the ring having relatively sharp annular edges thereon underlying and substantially flush with the entrances to said grooves and against which the inner surfaces of said tubular members are wedged by the inclined faces of the outer side walls of said grooves when the ends of said tubular members are moved into said grooves.

2. A connector of the class described for use in forming a joint between tubular metal members, comprising a metal ring having circumferential grooves extending axially thereinto from opposite ends and adapted to receive the ends of said tubular members, the internal faces of the inner and outer side walls of the grooves being inclined toward the axis, which passes through the center of the ring and which is substantially coincident with the axes of the tubular members to be connected, as the bottoms of the grooves are approached and the ends of the ring having relatively sharp annular edges thereon underlying and substantially flush with the entrances to said grooves and against which the inner surfaces of said tubular members are wedged by the inclined faces of the outer side walls of said grooves when the ends of said tubular members are moved into said grooves, the spacing of said inner and outer side walls at the entrances to said grooves being such in relation to the thickness of said tubular members that annular crevices are formed between said outer side walls and the outer surfaces of said tubular members for the reception of weld material.

HERMAN A. UNKE.